United States Patent
Van Den Berghe

(10) Patent No.: US 10,673,609 B2
(45) Date of Patent: Jun. 2, 2020

(54) SYNCHRONIZATION DEVICE, METHOD, PROGRAM AND SYSTEM

(71) Applicant: FUJITSU LIMITED, Kawasaki-shi, Kanagawa (JP)

(72) Inventor: Sven Van Den Berghe, Marlow Buckinghamshire (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/367,989

(22) Filed: Dec. 2, 2016

(65) Prior Publication Data
US 2017/0163411 A1    Jun. 8, 2017

(30) Foreign Application Priority Data
Dec. 7, 2015   (GB) .................. 1521550.2

(51) Int. Cl.
| | | |
|---|---|---|
| H04H 20/18 | (2008.01) | |
| H04L 7/033 | (2006.01) | |
| H04L 1/20 | (2006.01) | |
| H04L 12/24 | (2006.01) | |
| H04L 12/875 | (2013.01) | |
| H04H 60/80 | (2008.01) | |

(52) U.S. Cl.
CPC ........... *H04L 7/0337* (2013.01); *H04H 20/18* (2013.01); *H04L 1/203* (2013.01); *H04L 41/069* (2013.01); *H04L 47/562* (2013.01); *H04H 60/80* (2013.01)

(58) Field of Classification Search
CPC ........ H04N 21/4302; H04N 21/47217; H04N 5/04; H04N 21/242; H04N 21/4394; H04N 20/18; H04L 7/0337

USPC .................................................. 375/354, 371
See application file for complete search history.

(56) References Cited

U.S. PATENT DOCUMENTS 5,473,638 A * 12/1995 Marchetto .............. H04H 20/67
                                                                  327/161
7,934,239 B1    4/2011 Dagman
(Continued)

FOREIGN PATENT DOCUMENTS

WO   WO 2008/138047 A1   11/2008
WO   WO 2012/028851 A1    3/2012
(Continued)

OTHER PUBLICATIONS

Cover page of European Patent 2 759 174 A0, corresponding to WO 2013/041829 A1.
(Continued)

*Primary Examiner* — Kevin M Burd
(74) *Attorney, Agent, or Firm* — Staas & Halsey LLP

(57) ABSTRACT

A synchronization device, for use in a system of synchronization devices, to synchronize a received data stream with data streams received at other synchronization devices, and including a synchronization buffer receiving a data stream; an event detector detecting an event in the received data stream and to broadcast event information including an event detection time; and a delay computation element receiving, from each synchronization device, event information including the event detection time, to determine a delay time of a most delayed data stream, and to calculate a delay time to be applied to the received data stream to synchronize the received data stream with the most delayed data stream.

13 Claims, 6 Drawing Sheets

(56) References Cited

U.S. PATENT DOCUMENTS

| | | | |
|---|---|---|---|
| 2002/0036981 A1* | 3/2002 | Park | H04L 12/5602 |
| | | | 370/230 |
| 2008/0062315 A1 | 3/2008 | Oostveen et al. | |
| 2011/0273455 A1 | 11/2011 | Powar et al. | |
| 2014/0096169 A1 | 4/2014 | Dodson et al. | |
| 2015/0120953 A1* | 4/2015 | Crowe | H04L 65/60 |
| | | | 709/231 |
| 2015/0209670 A1* | 7/2015 | Furumoto | A63F 13/48 |
| | | | 463/24 |

FOREIGN PATENT DOCUMENTS

| | | | | |
|---|---|---|---|---|
| WO | WO 2012/048928 A1 | 4/2012 | | |
| WO | WO 2013/041829 A1 | 3/2013 | | |
| WO | 2014/204459 | 12/2014 | | |
| WO | WO 2014204459 A1 * | 12/2014 | | H04H 20/18 |

OTHER PUBLICATIONS

Cover page of European Patent 2 628 305 A0, corresponding to WO 2012/048928 A1.

United Kingdom Search Report dated May 25, 2016 in corresponding Great Britain Application No. 1521550.2.

Cronin et al., "An Efficient Synchronization Mechanism for Mirrored Game Architectures", Multimedia Tools and Applications, Kluwer Academic Publishers, 2004, pp. 7-30.

Extended European Search Report dated May 16, 2017 in corresponding European Patent Application No. 16193822.0.

* cited by examiner

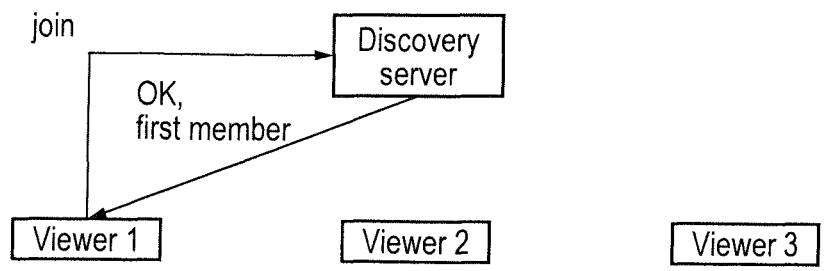
FIG. 5A
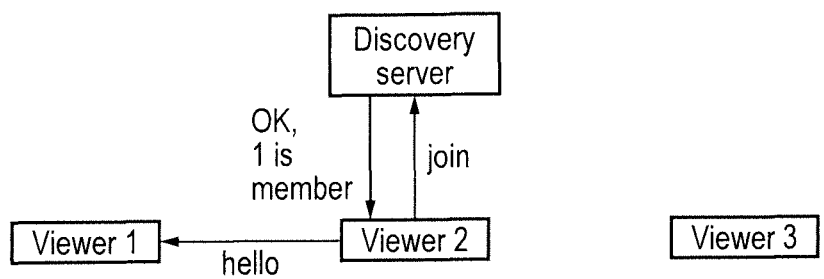
FIG. 5B
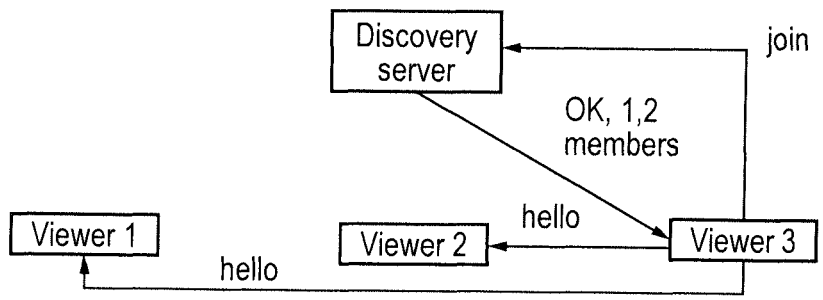
FIG. 5C
| Viewer 1 (Me) | Event time | 12:01:01 | 12:01:05 | 12:01:06 | 12:01:09 | 12:01:11 | 12:01:14 |
|---|---|---|---|---|---|---|---|
| | Difference | 1 | 4 | 1 | 3 | 2 | 3 |
| Viewer 2 | Event time | 12:01:01 | 12:00:58 | 12:01:02 | 12:01:03 | 12:01:06 | 12:01:08 |
| | Difference | 3 | 1 | 4 | 1 | 3 | 2 |
| Viewer 3 | Event time | 12:01:07 | 12:01:08 | 12:01:10 | 12:01:13 | 12:01:16 | 12:01:20 |
| | Difference | 4 | 1 | 3 | 2 | 3 | 4 |
FIG. 6

SYNCHRONIZATION DEVICE, METHOD, PROGRAM AND SYSTEM

CROSS-REFERENCE TO RELATED APPLICATIONS

This application claims the priority benefit of United Kingdom Application No. 1521550.2, filed on Dec. 7, 2015 in the United Kingdom Intellectual Property Office, the disclosure of which is incorporated herein in its entirety by reference.

BACKGROUND

1. Field

The embodiments relate to a synchronization device, method, program and system, and particularly, to a synchronization device, method, program and system for synchronizing a plurality of media streams for viewing by a distributed group of viewers accessing the media streams concurrently.

2. Description of the Related Art

Consumption of broadcast media is a popular activity. Previously dominated by simultaneous broadcast to certain device types i.e. televisions and radios, the increase in capabilities of networks has seen people consuming this content on a wide range of devices such as computers, phones and tablets. Although the media stream appears to be arriving at each of these devices live, in fact the requirements of networking and the need for the stream to be adjusted for different display capabilities of all the types of devices mean that the streams arrive at each device with a significant (several seconds) delay compared to the actual time at the origination of the media stream.

Social media, and the wide availability of video and audio conferencing, means that groups of people can interact with each other in real time without being physically close to each other. This makes it possible for distributed groups to share the experience of an event by watching it at the same time on their local devices and using other communication channels to interact with other members of the group. These interactions will include commenting or reacting to events in the media stream, like scores for a live sporting event. This form of interaction works best if all the members of the group experience the event at the same time and so the delays described in the previous paragraphs will reduce the enjoyment of the shared experience by the group.

The distribution of a group can occur at all ranges of physical separation, from different continents to different tables at the same bar (where the problem is that one table reacts to an event, say a score, by cheering before another table's device sees the event).

Members of a distributed group will acquire their media stream from different sources. If they are in different countries, then the shared event will be covered by local broadcasters (consider global transmission of Olympic events). These different sources will result in different delays to the stream.

The delays that are the main target of the embodiments are ones that are obvious when compared to other viewers of the same stream (say, half a second to seconds) and are also in place for a significant amount of time, say for the duration of the stream or for several minutes. Although, in the context of a group of viewers who are geographically close, say in the same venue, the delay tolerance is decreased meaning that only much smaller delays may be acceptable.

The main causes of these delays include:
Transcoding

Media streams need to be delivered in the correct format for the type of device and for the method of delivery, the format of terrestrial broadcast TV is different from satellite broadcast and both are different from media streams over IP. The original source will be in one format and the remaining formats are produced from this format. This reformatting, or transcoding, requires some processing and the time to do this delays transmission of the transcoded stream Deliberate Delay Some streams may contain deliberate delays inserted by the producers of the stream to, for example, allow the excision of swear words. Not all producers will insert the same length of delay.

Local Delays

The way that a viewer chooses to display the stream can introduce delays. For example, using a tablet to get the stream but displaying the result on a local TV (using, say Chromecast) can add a delay to the pure tablet display.

Different Start Times

If the group are watching a recorded stream (on demand), then they may each start watching at a slightly different time or if they agree to pause viewing for a time, then their restart may also be slightly asynchronous.

Playback Buffers

Different playback mechanisms have different buffer sizes, as a buffer introduces a delay to the stream, different buffer sizes will produce different delays.

Note that the networks and computing resource used to deliver a media stream are shared with many other users and uses and the contention for these resources varies. This means that there are slight variations over time in the apparent speed of a media stream. These results in temporary delays or speedups that are much smaller than the delays described above and compensated by the mechanism delivering individual streams. This source of delay is not a target of this embodiment, but if the different play speeds persist the embodiment will ensure that the delay does not get too large.

It is desirable to allow the synchronized concurrent viewing of a media stream by a distributed group of users where the media stream passes over different routes and receives different processing for each viewer. This allows the viewers to interact about events in the media stream without some viewers seeing events before others.

SUMMARY

According to an embodiment of a first aspect, there is provided a synchronization device, for use in a system including a plurality of synchronization devices, arranged to synchronizes a received data stream with data streams received at each of the other synchronization devices, the synchronization device comprising: a synchronization buffer configured to receive a data stream; an event detector configured to detect an event in the received data stream and to broadcast event information including an event detection time; and a delay computation element configured to receive, from the event detector of each synchronization device in the system, event information including the event detection time of the detected event at that event detector, to determine a delay time of a most delayed data stream in the system (having a largest delay time), and to calculate a delay time to be applied to the received data stream to synchronizes the received data stream with the most delayed data stream.

Embodiments relates to techniques to enable synchronized concurrent viewing of a media stream (such as video of a live event or pre-recorded video or audio streams) by users in different locations, where the media stream is supplied to each individual via a different route and possibly different content providers.

Media streams passing through different routes (for example over different transmission paths and channels) and targeted at different types of viewing device (for example television, radio, a computer monitor or a mobile device) suffer different amounts of delay, while individuals consuming these streams are often interacting with each other to discuss the event via instantaneous routes. This may lead to poor experience, for example while watching a video, where some individuals comment on events that others have not yet seen. Embodiments described herein can deliver a beneficial peer-to-peer synchronization between users that does not necessarily require a change to the media stream and can ensure that all the members of a viewing group see the common stream in lock-step.

In a wireless or wired communication system transmitting essentially the same information to a number of devices, each data stream (or media stream), which is received at a particular device may experience an amount of transmission delay different to that of the other data streams communicated to other devices in the system.

A data stream in the context of the embodiment may be a flow of data which is constantly transmitted from a data stream source (e.g. a broadcaster) and is correspondingly received at the device (which is usually termed a synchronization device in the context of the embodiments). The data stream may be continuously received at the synchronization device while being transmitted by the broadcaster.

A synchronization device receives the data stream from the data stream source and stores the data in the synchronization buffer for an amount of time (a delay time) in order that the data stream is subsequently displayed/output simultaneously with all other data streams in the system.

In order to calculate the delay time, the data stream is output from the synchronization buffer to an event detector (recognizer or identifier). The event detector detects an event to be used as a temporal marker from which the relative amount of delay experienced by the data stream, when compared with the other data streams in the system, can be calculated. The event detector then passes information (event information), indicating the time at which the event was detected, to a delay computation element (effectively a relative delay calculator).

The event detector, in order to determine the time at which the event is detected, may include a clock or may be connected to a separate time reference device. The delay computation element receives the event information from the event detector belonging to that particular synchronization device, as well as corresponding event information from all other event detectors (belonging to the other synchronization devices in the system), and determines the amount of delay in the received data stream of its own synchronization device relative to the delay experienced by the most delayed data stream in the system. The delay computation element then calculates the amount of delay required to allow the received data stream to be output synchronously with the most delayed data stream (at the corresponding synchronization device).

The synchronization device may be included in an output device (television, personal computer, mobile device, etc.) or may be a separate device at or towards the reception end of the data stream transmission. The synchronization device outputs the delayed data stream to the output device (or to the output section if it is incorporated in an output device) in synchronization with the output, by the other synchronization devices in the system, of the other data streams to corresponding output devices/output sections.

The delay computation element may receive the event information from the event detector of its own synchronization device by one method of transmission (a wired route for example) and the event information from all other event detectors in the system by another method (wirelessly for example). The delay computation element may include a separate event information recognition unit which recognizes the received event information and/or its origin based on the method of transmission.

The system may include a plurality of (potentially identical) synchronization devices, with one of the synchronization devices positioned at/in each receiver or data stream output point. Therefore, while the above embodiment refers to one of the synchronization devices, this is merely for explanatory purposes and it should be understood that other synchronization devices may have a corresponding set up.

Optionally, if the received data stream is the most delayed data stream in the system, the delay computation element is configured to adjust timing of the most delayed data stream by removing any previously applied delay time.

Correspondingly, the delay computation elements of the synchronization devices in the system are configured to synchronize with the most delayed data stream taking into account an adjustment to the timing of the most delayed data stream which removes any previously applied delay time. In other words, the delay computation elements synchronize with the adjusted timing.

Zeroing the delay added to the most delayed data stream avoids creep or buffer wastage, in which delay is added cumulatively as a different data stream becomes the most delayed data stream. For example a delay of "3" included (due to past performance) in the most delayed data stream will lead to delays of more than 3 in other devices.

Optionally, the event is an intrinsic characteristic of the data stream, such as a local maximum or minimum of a rate of change of a stream parameter.

In this embodiment, detectable events may be a specific event already part of each data stream. Any suitable algorithm can be used to detect a particular stream characteristic that can serve as an event. Advantageously, if the data stream already contains detectable events, there is no need to add specific events, which reduces processing and further allows the data stream to remain unchanged, lowering the chance of corruption of the data in the data stream. Detectable events may however be added to data streams (at the data stream source for example). An advantage of adding detectable events may be seen in a data stream having few or no intrinsic detectable events. In this case specific, easily detectable events may be added at the transmission end to ensure no event detectors fail to detect the event.

Optionally, the calculated delay time is applied by changing the synchronization buffer capacity.

The delay computation element may set the used capacity of the buffer to apply a required delay time value. Here, the delay time is dictated by how much of the data stream is buffered (delayed) before being output. By controlling the delay amount based on the set used capacity of the buffer, the synchronization device is simplified in that the delay becomes a passive action resulting from the buffer size. This reduces the need for control signals to indicate the delay time and further ensures that the buffer resource is used appropriately.

Optionally, the data stream passes through the event detector after passing through the synchronization buffer.

By passing the data stream through the event detector after the synchronization buffer, closer alignment of the data stream with its intended output timing is achieved. Additionally, positioning the event detector later along the transmission path of the data stream means that delays associated with the communication of the data stream at all preceding stages can be taken into account, in particular unpredictable delays which may affect the output time of the data stream.

Optionally, the event information further includes an identifier identifying the synchronization device, and an indication of buffer capacity of the synchronization buffer.

Knowledge of the identifier and buffer capacity allow this data to be stored and updated for respective synchronization devices. This can allow simple application of a new delay time, taking into account any adjustment made by the device receiving the most delayed stream. In effect, other devices are aware of the identity of the device with the most delayed stream and its current buffer capacity (delay) and can subtract this current delay from the delay added to synchronize with this device.

The capacity of the synchronization buffer may be presented in any suitable way, such as terms of absolute capacity (total size/memory) or as a percentage of the total size of the buffer (i.e. used capacity as a percentage of available (used and unused) capacity), or using a time unit or an arbitrary set of units. As technology advances and streaming media become higher in quality, the amount of associated data increases. Therefore, including information on the buffer capacity may also be used to provide early warning that a buffer needs to be upgraded in a system.

Optionally, the synchronization device further comprises a storage unit to store the event information for a plurality of events from each of the other synchronization devices. In this case, a sequence of time gaps between sequential stored events may be used to calculate the delay time to be applied. For example, if there are irregular events, the time offset between data streams at different devices can be detected by aligning the series of varying time gap values in the data streams. The series will be of the same time gap values at each device, but offset by the different time delays. All buffers have an initial set up with zero delay.

Optionally, a different media stream is also received by the synchronization device, the different media stream comprising different data from the data stream (such as a separate audio stream or commentary, including a twitter feed and the like), the different data being temporally linked to the data stream and the delay computation element being configured to apply a delay time to the additional stream so that it is synchronized with the data stream. For ease of distinction, this delay time will be referred to herein after as a different media delay time.

Data streams received at the different devices may all include the same data. For example, if a televised event is transmitted to multiple televisions (through multiple synchronization devices) all televisions will display essentially the same data. Alternatively, the data may be corresponding but not identical. For example, one data stream may include data for showing a televised event (e.g. a sporting event/program) and another different media data stream received by a different device or the same device may include data for showing a separate audio commentary to the televised program. The two would preferably be output in synchronization so that the target audience could experience the program with the commentary at the desired time. The two (or more) data streams in this case would not have the same data as each other, but would be intended to be played back (output to the audience) in time with each other. In a further scenario, some data streams within the system may include the same data, while others may include different but corresponding data as described above.

Optionally, the data stream includes an on-demand media piece and the different media stream includes an interactive messaging feed, and the delay computation element is configured to determine a time offset between a live start time of the media piece and an on-demand start time of the media piece including the calculated delay time, and to use this time offset to synchronize the different media stream with the data stream by applying the time offset to the different media stream to display messages in the interactive messaging feed in synchronization with playback of the media piece.

On-demand viewing can relate to the situation in which a group decides to watch a stored show, which may have originally been broadcast live. In this situation there will be delays as each viewer starts to play the on-demand media piece at slightly different times, or wishes to fast forward to slightly different points.

For watching on-demand services, such as recorded version of broadcast shows, embodiments make it possible to synchronize with interactive messaging feeds from people who are not part of the group and who reacted to the show during the initial broadcast. The interactive messaging feed may include a show offset indicating the time difference between a group-local time and the time of initial broadcast. The messaging feed could also be enhanced to include an option to mark a time in the show timeline where a message is posted to the feed so that asynchronous messages can be merged into the timeline as if they occurred during the initial broadcast.

Optionally, the synchronization buffer also acts as a playback buffer which compensates for changes to the rate of stream delivery.

According to an embodiment of a further aspect, there is provided a system including a data stream source and a group of synchronization devices as variously described above.

The system includes at least one data stream source. There may be more data stream sources depending on the data being streamed. One data stream source may be a single physical transmitter/broadcaster or may include multiple transmitters, for example to boost transmission range. Multiple data stream sources may be used, for example, when the system extends over a large area geographically, or when the data streams include different, but corresponding data, which is described in more detail below.

Optionally, one or more of the synchronization devices is a network edge proxy which controls the delay of the data stream and transmits the data stream on to a user device.

Optionally, the system further comprises a discovery server configured to store system information relating to each synchronization device in the group, wherein, when a new synchronization device is added to the group, the new synchronization device transmits a request for system information to the discovery server and the discovery server transmits a response to the new synchronization device including the system information.

The discovery server may be contacted by a synchronization device wishing to join the system (group of synchronization devices).

According to an embodiment of a still further aspect, there is provided a method of synchronizing a received data stream, received at a synchronization device in a system including a plurality of synchronization devices, with data streams received at each of the other synchronization devices in the system, the method comprising: receiving a data stream at a synchronization buffer of the synchronization device; detecting, by an event detector, an event in the received data stream; broadcasting, by the event detector, event information including an event detection time; receiving, from the event detector of each synchronization device in the system, event information including the event detection time of the detected event at that event detector; determining a delay time of a most delayed data stream in the system (having a largest delay time); and calculating a delay time to be applied to the received data stream to synchronize the received data stream with the most delayed data stream.

The most delayed data stream in the system is the data stream with the largest (relative) delay time or is most delayed based on the detected event detection time. As noted above, the timing of the most delayed data stream can be adjusted by zeroing the delay time added to the corresponding device.

According to an embodiment of a still further aspect, there is provided a program which, when executed on a computer processor, is configured to cause the computer processor to carry out a method according to the above embodiment.

Each of the functional modules/devices described above may be realized by hardware configured specifically for carrying out the functionality of the module. The functional modules may also be realized by instructions or executable program code which, when executed by a computer processing unit, cause the computer processing unit to perform the functionality attributed to the functional module. The computer processing unit may operate in collaboration with one or more of memory, storage, I/O devices, network interfaces, sensors (either via an operating system or otherwise), and other components of a computing device, in order to realize the functionality attributed to the functional module. The modules may also be referred to as units or elements, and may be steps or stages of a method, program, or process.

The synchronization device may be realized by a single entity such as a computing device or server, or may be realized by more than one computing device operating collaboratively, for example, as a layer of a control protocol. Therefore, each functional module may be executed by components belonging to a plurality of computing devices, and the functional modules may be provided by more than one computing device.

Although the aspects (software/methods/apparatuses) are discussed separately, it should be understood that features and consequences thereof discussed in relation to one aspect/embodiment are equally applicable to the other aspects. Therefore, where a method feature is discussed, it is taken for granted that the apparatus embodiments include a unit or apparatus configured to perform that feature or provide appropriate functionality, and that programs are configured to cause a computing apparatus on which they are being executed to perform said method feature. In any of the above aspects, the various features may be implemented in hardware, or as software modules running on one or more processors.

Hence a method according to preferred embodiments can comprise any combination of the apparatus aspects. Methods according to these further embodiments can be described as computer-implemented in that they require processing and memory capability.

The embodiments can be implemented in digital electronic circuitry, or in computer hardware, firmware, software, or in combinations of them. The embodiments can be implemented as a computer program or computer program product, i.e., a computer program tangibly embodied in an information carrier, e.g., in a machine-readable storage device or in a propagated signal, for execution by, or to control the operation of, one or more hardware modules. A computer program can be in the form of a stand-alone program, a computer program portion or more than one computer program and can be written in any form of programming language, including compiled or interpreted languages, and it can be deployed in any form, including as a stand-alone program or as a module, component, subroutine, or other unit suitable for use in a data processing environment. A computer program can be deployed to be executed on one module or on multiple modules at one site or distributed across multiple sites.

An advantage associated with the embodiments is the enhanced consumption of data streams (media streams) by groups of physically separate people interacting through "second screens" (such as an additional device, e.g. phone/tablet, used at the same time as viewing occurs on a primary device, e.g. a TV screen. Second screens may be used to interact via other routes such as live messaging, Twitter, live blogs, voting etc.). The embodiments can be effective for all types of devices and networks, requiring no changes to the methods that deliver the media streams. Use of the embodiments encourages the consumption of broadcast and on-demand media, offering revenue opportunities to content creators and to network providers. The embodiments can be implemented as a service delivered from network edge computing, so targeting any type of display equipment.

BRIEF DESCRIPTION OF THE DRAWINGS

These and/or other aspects and advantages will become apparent and more readily appreciated from the following description of the embodiments, taken in conjunction with the accompanying drawings of which:

Preferred embodiments will hereinafter be described, by way of example only, with reference to the attached drawings, in which:

FIGS. 5A-5C show an example of the flow of messages as viewers join a group;

FIG. 6 shows a sample data structure for a 3 viewer system;

DETAILED DESCRIPTION

Figure 1:
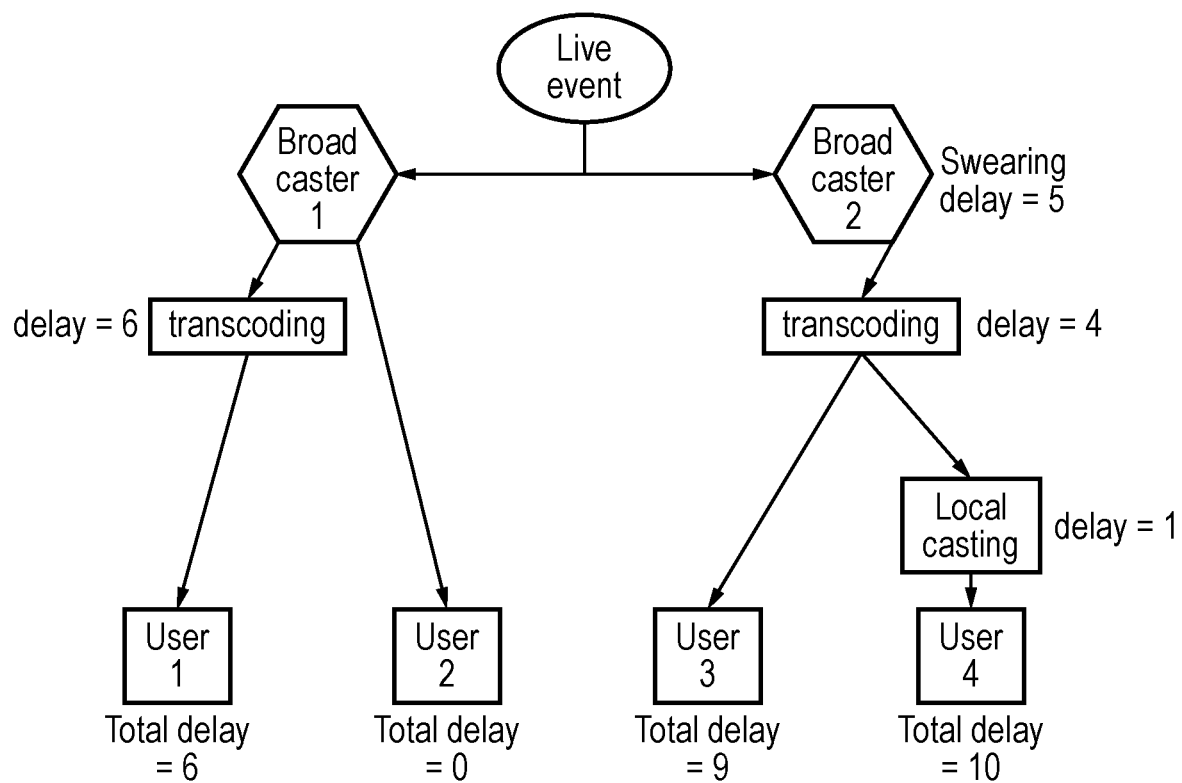
FIG. 1 is an example showing the source of delays in different media streams.

Reference will now be made in detail to the embodiments, examples of which are illustrated in the accompanying drawings, wherein like reference numerals refer to the like elements throughout. The embodiments are described below to explain by referring to the figures.

FIG. 1 is an example of the sources of delay in receipt of a media stream and the effect on the received stream. Two broadcasters (labeled broadcaster 1 and broadcaster 2) are delivering coverage of the event over a variety of sources. The cameras and mixing are a common operation and the same stream is delivered to both broadcasters. Broadcaster 1 transmits the event without any editorial delays, where as broadcaster 2 delays the stream for 5 seconds. Both broadcasters apply transcoding to some streams to allow for different user devices, but they use different techniques so the delay introduced by broadcaster 1 is 6 seconds and the delay from broadcaster 2 is 4 seconds. Users 1 to 3 view the event directly on their receiving device, while user 4 casts the stream from her device to a television (TV), introducing a further 1 second delay. The cumulative effect of these delays is that there is a 10 second time difference between when user 1 sees an incident and user 4 sees the same incident.

An embodiment includes inserting a delay for the media stream individually for each member of a viewing group. The size of each delay is different and is determined so that the display is in time with a "group time" rather than in time with receipt of the stream. The group time is a commonly agreed delay to the stream so that the slowest (most delayed) group member sees events at the same time as the least delayed member. Group time is determined by local computation using lightweight peer-to-peer sharing of information about when events detected in the media stream happen.

In detail, in a system including many reception devices, each reception device includes a synchronization part used to synchronize the output of the reception device with the output of all other reception devices in the system. For example, at a sporting event or venue, each reception device may be embodied in a television and synchronized output means all TVs play the relevant audio/visual feed at the same time.

In order to achieve this, an embodiment employs the synchronization device. Such a part, in one embodiment, includes a buffer (synchronization buffer) which receives the incoming data stream and stores it for an amount of time dictated by a delay computation element. Each reception device in the system includes such a delay computation element. Each reception device further includes an event detection device. Together, the delay computation element, the event detection device and the synchronization buffer make up the synchronization device.

The event detection device is configured to detect an event in the received data stream and broadcast (transmit) (at least to the delay computation element and to other delay computation elements of the other reception devices in the system) event information indicating the time at which the event was detected.

The delay computation element hence receives event information from all of the event detection devices in the system, allowing it to calculate the maximum amount of time that any one stream is delayed, compare that amount of time to the event detection device of its own reception device and determine the time difference between the reception of its own data stream and that of the slowest (most delayed) data stream in the system.

If the delay computation element concludes through the comparison and determination, that none of the other data streams in the system are slower than its own data stream, the delay computation element considers itself to have the slowest data stream in the system and instructs the synchronization buffer not to delay the data stream (that is, to apply a delay of zero). If however another data stream is calculated as being slower than its own data stream, the delay computation element calculates the difference between the time at which the event in its own data stream was detected and the time at which the event in the slowest data stream was detected, and instructs the synchronization buffer to delay the data stream by an amount of time equal to the difference minus any delay removed from the device with the slowest data stream so that the own data stream is then output from the synchronization buffer at the same time as all other data streams in the system are output from their respective synchronization buffers.

Once the data stream has been delayed by the calculated delay time, the data stream is forwarded to a display/output unit for communication to the intended audience.

Figure 2A:
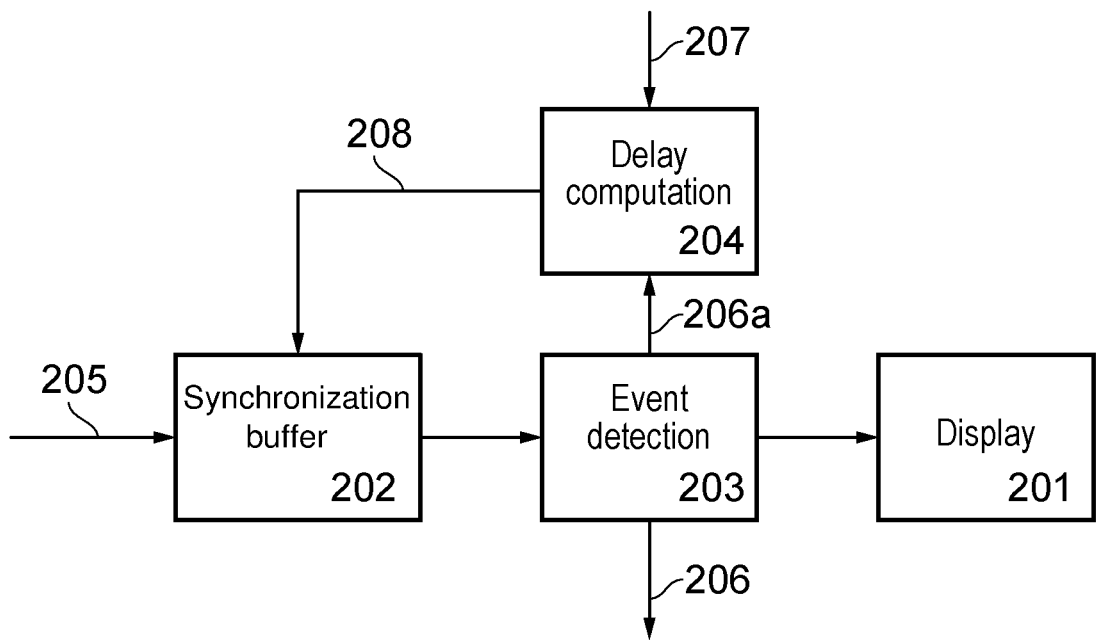
FIG. 2A shows an embodiment as applied to a single viewer.

FIG. 2A shows an embodiment as it applies to a single viewer. The viewer's display 201 is enhanced by three new components 202, 203, 204. 202 is the synchronization buffer, introduced to add a delay between the receipt of the media stream 205 and its display on 201. The length of the delay varies between members of the viewing group and is controlled for each individual viewer by the delay computation element 204. The media stream passes through an event detection element 203 after the synchronization buffer (this arrangement increases the efficiency of the alignment operations in the delay computation element as the events are in closer synchronization). A variant of this embodiment places 203 before 202 and potentially removes the need to broadcast the current buffer size at the possible expense of more computation in 204. The event detection elements detect similar events in the media stream of all member of the viewing group (see below for further discussion) and transmits the time of these events to the delay computation elements of all the members of the group (shown as outgoing arrows 206 and 206a for transmission, and incoming arrow 207 for reception of timings from other group members). Changes to the delay required for synchronization are transmitted (arrow 208) to the synchronization buffer as necessary by the delay computation element and to the display 201 to allow smooth transition to the newly synchronized viewing time.

Figure 2B:
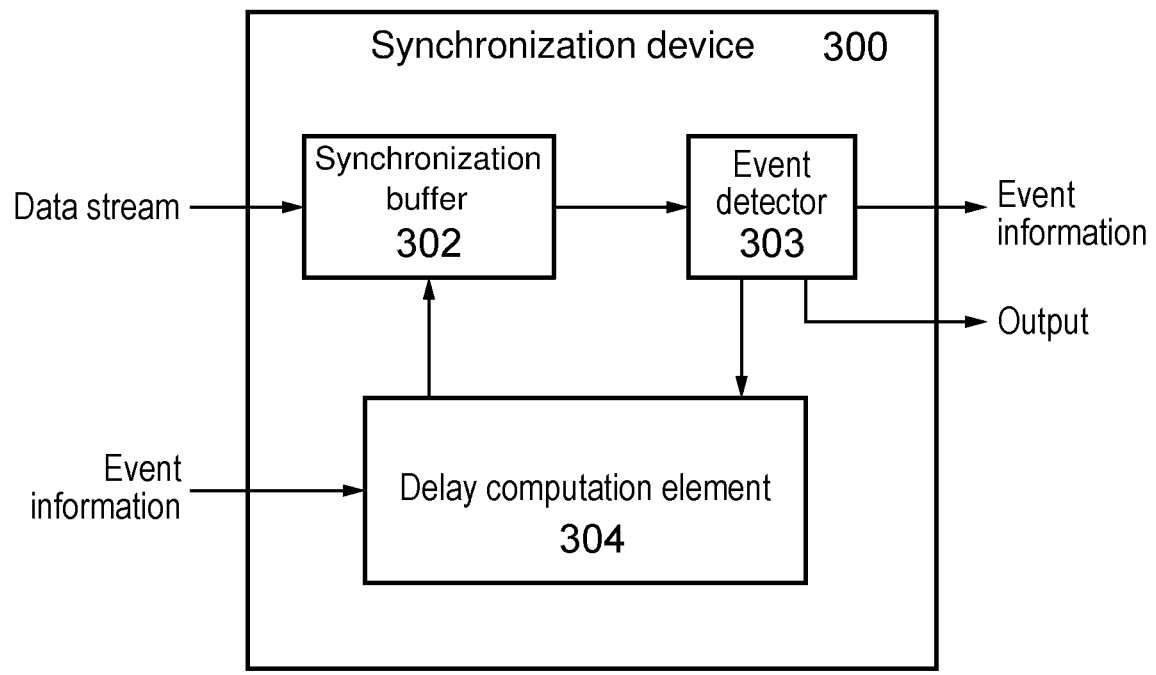
FIG. 2B shows a simplified embodiment.

FIG. 2B shows an embodiment of the synchronization device 300, in a system (not shown), in which the data stream (DS) is received at the synchronization device 300, the data stream being received for example from a data stream source. The received data stream is then buffered in the synchronization buffer 302 for a predetermined amount of time, or a delay time, after which the data stream is forwarded to the event detector 303 (event detection element). The event detector 303 detects events in the data stream (which are either part of the data stream data or may be added to the data stream separately). The event detector 303 then indicates an event detection time, at which an event was detected, and transmits (broadcasts) the event detection time to the other synchronization devices 300 in the system and to the delay computation element 304, as event information (EI). More specifically, the event detector 303 transmits the event detection time to each delay computation element 304 in the system. Then the delay computation element 304, which has now received the event detection times from each event detector 303 in the system, determines what the largest delay time of any data stream in the system is, based on the received event detection times. This largest delay time is then compared with the delay time experienced by the received data stream (the data stream received at the synchronization device 300 including the delay computation element 304 performing the comparison). From this comparison, the delay computation element 304 calculates an amount of (additional) delay time required to synchronize the received data stream with the data stream having the largest delay time. This calculated delay time is then applied in the synchronization buffer 302 to the data stream (which is continuously being received from the data stream source). Thereby the received data stream is synchronized with the most delayed data stream (data stream having the largest delay time) in the system. The received data stream is output from the synchronization device 300 (to an output/display device 301).

Figure 2C:
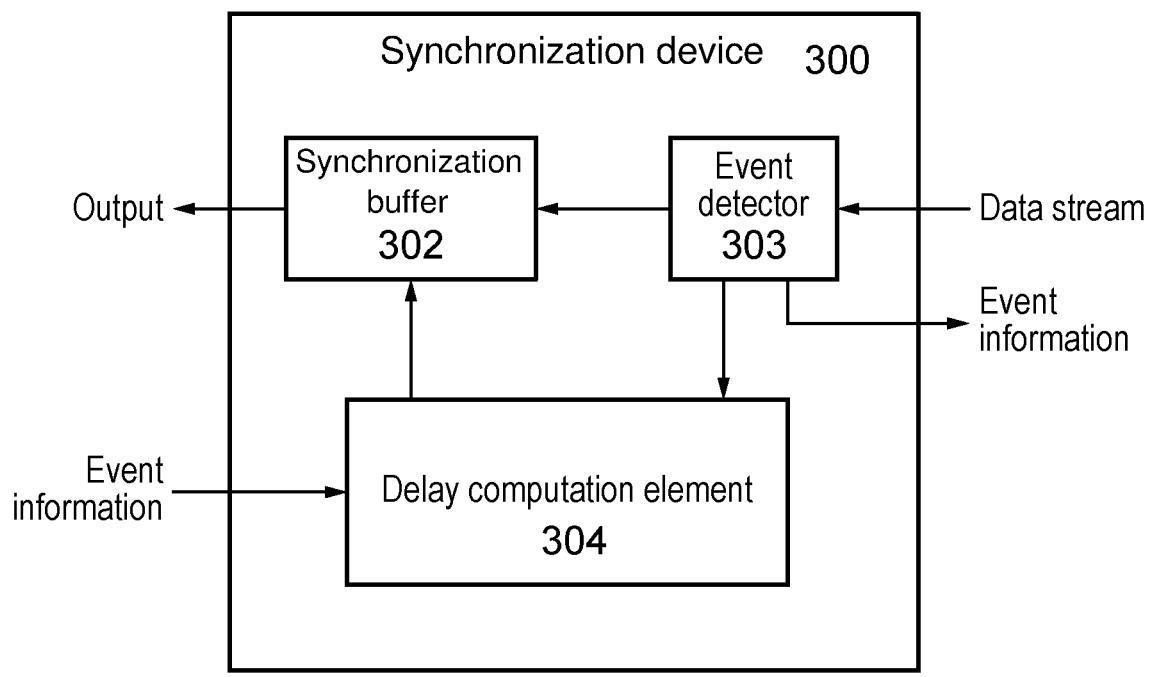
FIG. 2C shows an embodiment in which the received data stream passes through the event detector first.

FIG. 2C shows a modification of the embodiment shown in FIG. 2B in which the received data stream first travels through the event detector 303 and subsequently through the synchronization buffer 302. This arrangement allows the delay time to be calculated before being added meaning the delay time is accurate from the first application. Other components are as previously described for FIG. 2B.

Figure 2D:
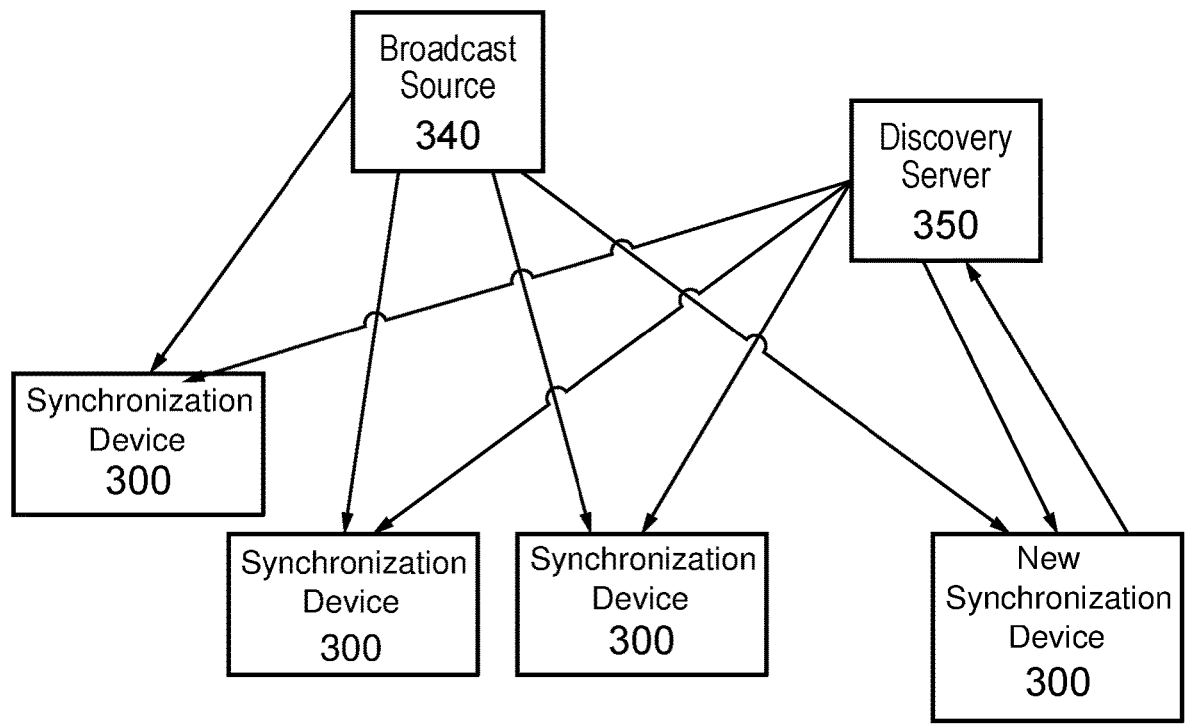
FIG. 2D shows an embodiment of a system including a discovery server.

FIG. 2D shows an exemplary embodiment of a system or group including multiple synchronization devices, a broadcast source 340 and a discovery server 350 (central server) to be used within the system. The discovery server 350 is contacted by a synchronization device 300, which may be embodied in an output device 301, which is to be added to (included in) the system. The discovery server 350 receives a request (req) for information relating to the system from a device wishing to join the system. The discover server 350 then stores information relating to the new device. The discovery server 350 also stores system information (SI) relating to all the devices in the system (itself, the data stream source(s) and each receiver, including each synchronization device 300). More particularly, a discovery server 350 may be configured to store system information identifying each synchronization device 300 in the system, wherein, when a new synchronization device 300 wishes to join the system, the synchronization device 300 may contact the discovery server 350 and in response the discovery server 350 sends the new synchronization device 300 the system information. The discovery server 350 may then transmit the information relating to the new synchronization device 300 to the existing synchronization devices in the system 300. The discovery server 350 may be arranged as a separate entity or may be included in one of the synchronization devices 300 in the system.

Figure 3:
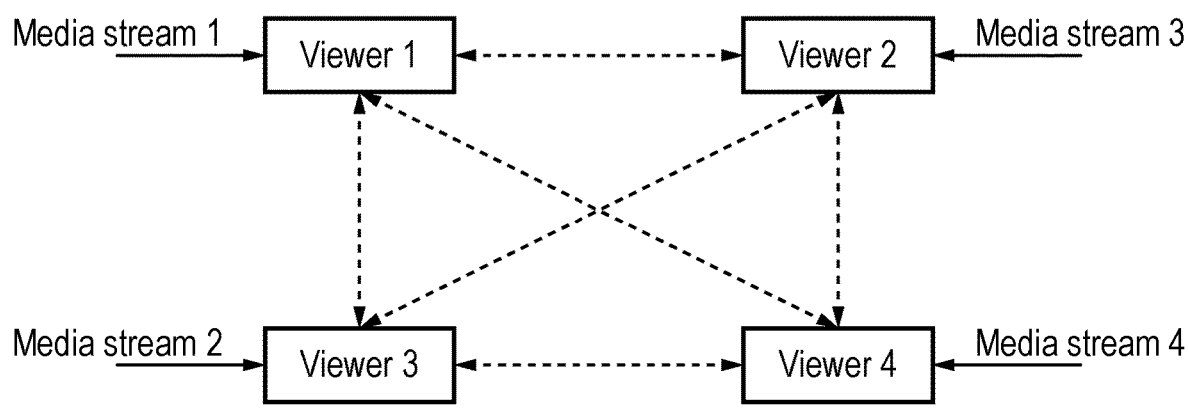
FIG. 3 shows an example of the patterns of interactions between the members of a group whose media streams are being synchronized.

FIG. 3 shows the patterns of interactions between the members of a group whose media streams are being synchronized. There are 4 viewers, each receiving a different media stream, from different sources and via different routes. As illustrated in FIG. 1, each stream may have a different delay. The dotted lines indicate the broadcast of events to all other group members (external representations of lines 206 and 207). Therefore, each device is configured to transmit the event information to all other devices in the system and receive event information from each of the other devices in the system. By this method, the delay computation element is able to obtain the relevant information required to reliably calculate the appropriate delay time for the synchronization device in which it is located.

Figure 4:
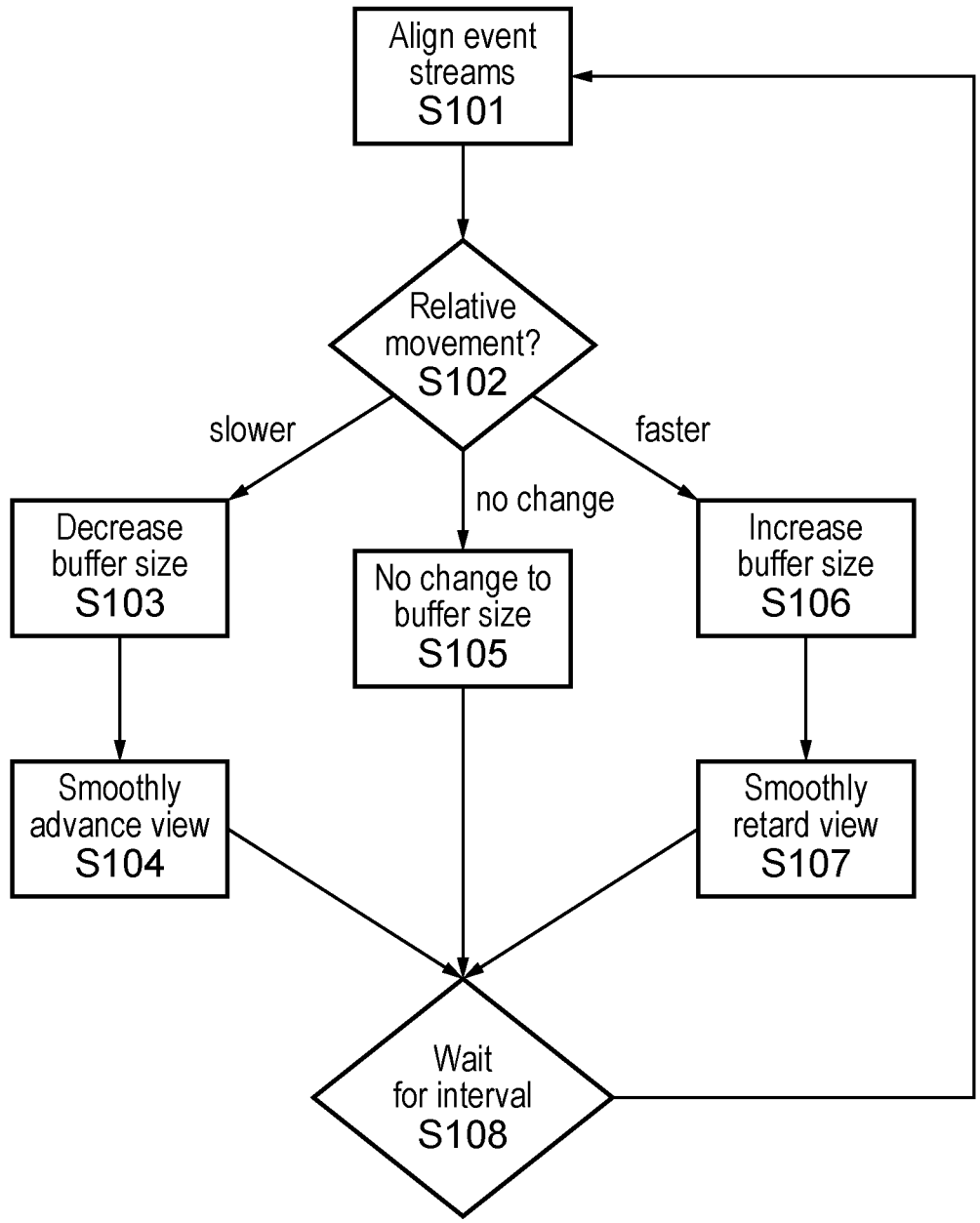
FIG. 4 shows the flow of control of an embodiment of the delay computation element.

FIG. 4 shows the flow of control of an embodiment of the delay computation element 204. As shown in FIG. 4, the delay computation element 204 aligns the event stream (data stream including events) of its own device with that of the others in the system (S101). This alignment is carried out based on the event information and the calculated delay time. Then, from subsequent events, any relative movement is detected (S102) between the data streams (between the data stream received at the synchronization device to which the delay computation element belongs and the most delayed data stream in the system) the delay computation element changes the size of the synchronization buffer accordingly. If the received data stream is slower relative to the previously measured delay then the buffer size is decreased (S103) as less delay is needed to bring the received data stream into synchronization with the most delayed data stream. In order to minimize the visibly apparent change in the delay, the data stream is smoothly advanced (S104) as detailed below. If there is no change in the measured delay then the buffer size is not changed (S105). If the received data stream is faster relative to the previously measured delay then a larger delay time will need to be applied and the buffer size is increased (S106). In order to minimize the effects of this change, the data stream is smoothly retarded (slowed down) (S107) as detailed below. Then, after the appropriate action is taken to adjust or maintain the buffer size, the delay computation element 204 waits for the next interval (S108) to receive event information so as to align the data streams again (S101).

Therefore, at regular, but not too frequent, intervals the delay computation element aligns the event streams of all group members (this occurs in the delay computation element of all members independently). It then computes the size of the buffer that it must maintain to synchronize the stream with the slowest member. If it has advanced with respect to the slowest member, then the buffer size is increased. If it has retarded (or become the slowest) then the buffer size is reduced.

The media stream presented to the viewer will similarly need to be advanced or delayed to reflect the change in buffer size. This change may be large enough to cause an artifact (jump or pause) that is noticeable to the viewer. The effect of these artifacts can be reduced by smoothly moving to the new media display point using well known techniques for compressing or expanding time in media streams, for example those used to implement double and half speed play buttons.

The synchronization buffer is different from the playback buffer functionality used in the media playback software. Playback buffers are used to compensate for changes to the rate of stream delivery whereas the synchronization buffer is used to introduce a delay to the stream. A side effect of the playback buffer may be to delay the stream, so implementations of this embodiment could use modified buffers in the playback software that provide both playback and synchronization capabilities.

The software that supports a group of viewers wishing to share a stream forms a peer-to-peer network. Peer to peer networking is a well-understood area and many of the standard techniques can be used to form the synchronized viewing network. However, the group will be distributed and communicating via a variety of technologies (wired, wireless), so initial peer discovery may need to use a designated central server or a known node in an established network for introductions. A central server has been used for illustration purposes in FIG. 5 that shows the flow of messages as viewers join a group. New viewers contact the discovery server for group details, receiving a list of current members in reply. They then introduce themselves to the other group members and thereafter event information may be broadcast to and from each synchronization device to allow the new group member (and the existing group members) to calculate the appropriate delay time.

The requirements for synchronization to deliver a satisfactory shared experience are much less stringent than other types of media synchronization. Synchronizing voice and video on the same stream has very tight requirements as the mind detects very small disparities between the time of a movement and the sound produced. The synchronization requirements for shared experiences are much looser as they are determined by human reaction times and in cases where the group interaction is through text messaging by the time to conceive and write a message. This means that there is no need to use precisely locatable beacons and a loose, approximate synchronization will suffice. It is desirable however to improve the synchronization as far as practicable within the imposed system limitations.

In one embodiment, software used by each group member monitors the media stream for identifiable events (see below for one way to define easily detectable events) where the event detection is designed so that every group member will detect the same events. Events may occur in an irregular pattern. Each member broadcasts a message for every event detected in the stream to all other members of the viewing group. The message contains an identifier for the member, a timestamp of the detected event and the current buffer size (which corresponds to delay time) of the member. The timestamp is a time value synchronized with all group members, for example using the Network Time Protocol.

Every group member maintains a data structure that records a reasonable (say 10) number of received messages from every other group member. Periodically, members perform a synchronization check that matches the pattern of event time differences to determine how far it is offset from every other member. It adjusts its local offset (and buffer size) to synchronize to the most delayed member.

FIG. 6 shows an example of a sample data structure for a 3 viewer system in viewer 1's synchronization unit.

The current buffer sizes for the viewers are 0, 2, 1 i.e. viewer 1 was the slowest at the previous synchronization point.

The event sequences between me (viewer 1) and viewer 2 align if the sequence of viewer 1 is advanced by 1 column (difference is 1, 4, 1, 3 . . . ) and the timings show that the stream for me (viewer 1) is 3 seconds behind viewer 2. Similarly, by advancing viewer 3 by 1 column, the differences align and show that viewer 3 is 2 seconds behind me (viewer 1). In other words, the methodology adjusts the streams so that the same time differences between subsequent events are aligned (this is why it is important to use irregular events). The amount of adjustment required indicates the relative delays of the streams. The methodology allows delay calculation without further data beyond the irregular events themselves (such as event labeling).

The inferred order of the viewed streams is: viewer 3, viewer 1 (2 seconds ahead), viewer 2 (further 3 seconds ahead). Viewer 1's delay computation unit could therefore instruct its synchronization buffer to increase the delay by 2 seconds to synchronize with viewer 3. Similar computations for viewer 2 would cause a delay increase of 5 seconds and viewer 3 would make no change.

Following these computations, the initial settings of the new buffer sizes are 2, 7, and 1. In order to prevent creep in buffer size, the minimum buffer size is reduced to 0 and the delay computation units actually sends commands as follows: viewer 1, increase buffer size to 1, viewer 2 increase buffer size to 6, viewer 3 decrease buffer size to 0.

Optimal event detection may require two characteristics, that it is efficient to execute and that it produces a distribution of events that can be reliably aligned. The following is one example of ways to detect events, but there are many more.

Media streams move between periods of rapid change and slow change, so:

1) Compute a measure of frame-by-frame difference as the sum of the absolute value of the differences between pixels:

$$d(t, t+1) = \sum_{i,j}^{I,J} |p(i, j, t) - p(i, j, t+1)|$$

Where d(t,t+1) is the measure of the difference between frames at time t and time t+1, p(i,j,t) is the pixel value at location i,j at time t. I,J are the dimensions of the frame. Pixel values are generally a number or collection of numbers that affect the light emitted by a pixel. Pixel values may for example indicate the intensity of light and/or specific colors emitted by the pixel. "p" may be, in an example, considered to be a group of values (pr, pg, pb) and the difference between two pixel values, say p=(pr, pg, pb) and q=(qr, qg, qb) could redefined as |pr−qr|+|pb−qb|+|pg−qg|.

2) Approximate the rate of change of differences as:

$$r(t) = d(t+1, t+2) - d(t-1, t)$$

3) An event occurs at a local maximum, a local minimum or an inflexion point of the distance measure:

$$|r(t)| < \text{threshold}$$

The threshold value is determined to achieve reliable event detection and due to a variety of factors, such as differing screen sizes, is different for each device type.

The components of the embodiment should in principle be inserted into the processing stream for video display where there are no more delays for which the embodiment compensates before final display, to ensure simultaneous output to the viewers.

Figure 7:
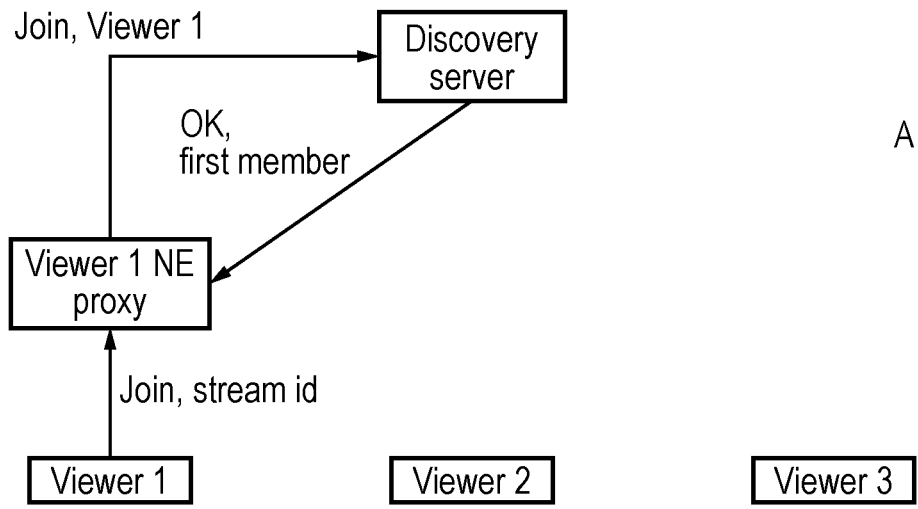
FIG. 7 shows a modified version, using an NE Proxy, of the example shown in FIG. 5A.
Figure 8:
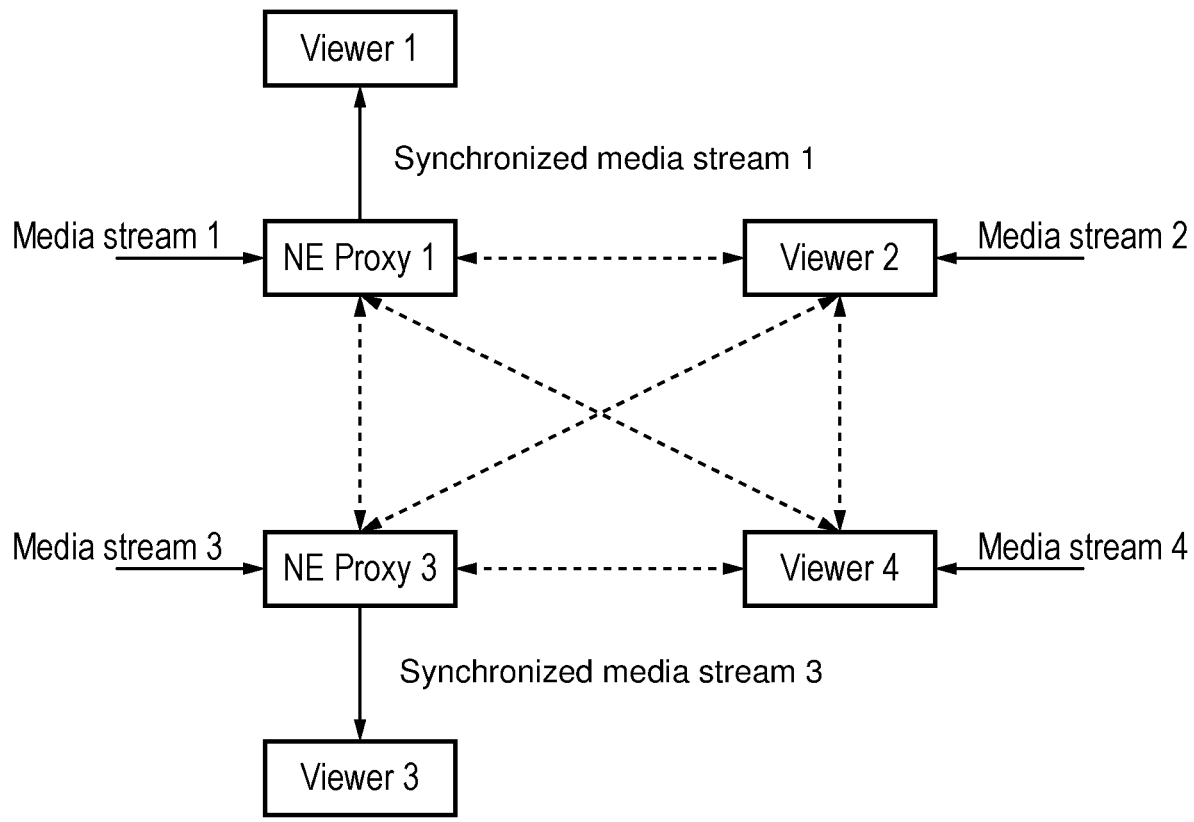
FIG. 8 shows a modified version, using two NE Proxies, of the example shown in FIG. 3.

Most of the delays occur in the upstream processing of the content stream, so this embodiment may also be offered as a service by each client's (group member) network services provider and implemented as a cloud service at the network edge. This offers the advantages of deployment to all media streams, without requiring software and device manufacturers to physically implement the embodiment individually. In one example case the network creates a Network Edge Proxy (NE Proxy) for the viewer that performs the functions of this embodiment as demonstrated in FIGS. 7 and 8. FIG. 7 modifies FIG. 5A so that a proxied viewer registers interest in synchronization of a media stream with the NE proxy, which then mediates further on behalf of the viewer, sending just the synchronized stream (as shown in FIG. 8, which updates FIG. 3 with NE proxies for two of the group members).

In another embodiment all of the components may be implemented as part of the multimedia software of the display device (smartphone, set top box, computer etc).

The viewing group may also want to interact with the wider world through such means as social media message streams (Twitter, Facebook comments, social media network comments). Normally these will arrive in the real world time and so viewing groups using this embodiment will experience the same pre-emption of events as the embodiment solves for within group communications. Applications displaying the social media messages streams, such as special purpose ones written for implementations of this embodiment, should also buffer the messages to the group-time offset or modify the message database query times with an offset to the group time.

Another area of application occurs in on-demand viewing, where a group decides to watch a stored show. Some of the sources of misalignment discussed above will not apply as the show is stored in multiple versions suitable for all device types and so there are no transcoding issues. However, there will be new constant delays as each viewer starts to play at slightly different times, or fast forwards to slightly different points.

When watching on-demand services, such as recorded version of broadcast shows, this embodiment makes it possible to synchronize with social-media streams from people who are not part of the group and reacted to the show during the initial broadcast (for example, so called "tweetalongs"). The social media feed is queried for messages with a tag relating to the show offset by the group-local time and the time to initial broadcast. The social media message tagging could also be enhanced to mark a time in the show timeline so that asynchronous messages can be merged into the timeline as if they occurred during the initial broadcast.

Although a few embodiments have been shown and described, it would be appreciated by those skilled in the art that changes may be made in these embodiments without departing from the principles and spirit thereof, the scope of which is defined in the claims and their equivalents.

What is claimed is:

1. A synchronization device, for use in a system including a plurality of synchronization devices, arranged to synchronize a received data stream with data streams received at each of other synchronization devices, the synchronization device comprising:
   a synchronization buffer configured to receive a data stream;
   an event detector configured to detect events in the received data stream and to broadcast event information including event detection times; and
   a delay computer configured to:
      receive, from the event detector of each synchronization device in the system, event information including the event detection times of detected events at that event detector,
      determine a first delay time of a most delayed data stream in the system, to calculate a second delay time, applied by changing a capacity of the synchronization buffer such that a delay time applied is a result of the capacity, to be applied to the received data stream to synchronize the received data stream with the most delayed data stream, and
      instruct the synchronisation buffer to delay the data stream by the second delay time to synchronize the received data stream with the most delayed data stream,
   wherein the event detector is positioned after the synchronization buffer so that the data stream passes through the event detector after passing through the synchronization buffer,
   wherein the delay computer is configured to, without information to distinguish between the events in the received data stream other than the event detection times, and without information to distinguish between the events in each other said data stream other than the event detection times, determine which data stream is the most delayed data stream by aligning differences between the detection times of consecutive events in the received data stream with differences between the detection times of consecutive events in each other said data stream to align an event sequence comprising the consecutive events in the received data stream with an event sequence in each other said data stream comprising the consecutive events in that other said data stream, and
   wherein an amount of adjustment required to align event sequences in the data streams indicates respective delays of the data streams.

2. The synchronization device according to claim 1, wherein, when the received data stream is the most delayed data stream in the system, the delay computer is configured to adjust timing of the most delayed data stream by removing any previously applied delay time.

3. The synchronization device according to claim 1, wherein a said event is an intrinsic characteristic of the data stream, including a local maximum or minimum of a rate of change of a stream parameter.

4. The synchronization device according to claim 1, wherein the event information further includes an identifier identifying the synchronization device, and an indication of the capacity of the synchronization buffer.

5. The synchronization device according to claim 1, wherein the synchronization device further comprises a storage to store the event information for a plurality of events from each of the synchronization devices.

6. The synchronization device according to claim 1, wherein a different media stream is also received by the synchronization device, the different media stream comprising different data from the data stream, the different data being temporally linked to the data stream and the delay computer being configured to apply a different media delay time to additional stream to synchronize the additional stream with the data stream.

7. The synchronization device according to claim 6, wherein the data stream includes an on-demand media piece and the different media stream includes an interactive messaging feed, and
   the delay computer is configured to determine a time offset between a live start time of the media piece and an on-demand start time of the on-demand media piece including the calculated second delay time, and to synchronize the different media stream with the data stream by applying the time offset to the different media stream to display messages in the interactive messaging feed in synchronization with playback of the media piece.

8. The synchronization device according to claim 1, wherein the synchronization buffer also acts as a playback buffer which compensates for changes to a delivery rate of stream delivery.

9. A system including a data stream source and a group of synchronization devices, each synchronization device comprising:
a synchronization buffer configured to receive a data stream;
an event detector configured to detect events in a received data stream and to broadcast event information including event detection times; and
a delay computer configured to:
receive, from the event detector of each synchronization device in the system, event information including the event detection times of detected events at the event detector of each synchronization device,
determine a first delay time of a most delayed data stream in the system, to calculate a second delay time, applied by changing a capacity of the synchronization buffer such that a delay time applied is a result of the capacity, to be applied to the received data stream to synchronize the received data stream with the most delayed data stream, and
instruct the synchronisation buffer to delay the data stream by the second delay time to synchronize the received data stream with the most delayed data stream,
wherein the event detector is positioned after the synchronization buffer so that the data stream passes through the event detector after passing through the synchronization buffer,
wherein the delay computer is configured to, without information to distinguish between the events in the received data stream other than the event detection times, and without information to distinguish between the events in each other said data stream other than the event detection times, determine which data stream is the most delayed data stream by aligning differences between the detection times of consecutive events in the received data stream with differences between the detection times of consecutive events in each other said data stream to align an event sequence comprising the consecutive events in the received data stream with an event sequence in each other said data stream comprising the consecutive events in that other said data stream, and
wherein an amount of adjustment required to align event sequences in the data streams indicates respective delays of the data streams.

10. The system according to claim 9, wherein at least one of the synchronization devices is a network edge proxy which controls the second delay of the data stream and transmits the data stream on to a user device.

11. The system according to claim 9, further comprising a discovery server configured to store system information relating to each synchronization device in the group, wherein, when a new synchronization device is added to the group, the new synchronization device is arranged to transmit a request for system information to the discovery server and the discovery server is arranged to transmit a response to the new synchronization device including the system information.

12. A method of synchronizing a received data stream, received at a synchronization device in a system including a plurality of synchronization devices, with data streams received at each of other synchronization devices in the system, the method comprising:
receiving a data stream at a synchronization buffer of the synchronization device;
detecting events in the received data stream;
broadcasting event information including event detection times;
receiving, from each synchronization device in the system, event information including the event detection times of detected events at each synchronization device;
determining a first delay time of a most delayed data stream in the system;
calculating a second delay time, applied by changing a capacity of the synchronization buffer such that a delay time applied is a result of the capacity, to be applied to the received data stream to synchronize the received data stream with the most delayed data stream, and
instructing the synchronisation buffer to delay the data stream by the second delay time to synchronize the received data stream with the most delayed data stream,
wherein an event detector for detecting the event is positioned after the synchronization buffer so that the data stream passes through the event detector after passing through the synchronization buffer,
wherein the determining the first delay time of the most delayed data stream comprises, without information to distinguish between the events in the received data stream other than the event detection times, and without information to distinguish between the events in each other said data stream other than the event detection times, determining which data stream is the most delayed data stream by aligning differences between the detection times of consecutive events in the received data streams with differences between the detection times of consecutive events in each other said data stream to align an event sequence comprising the consecutive events in the received data stream with an event sequence in each other said data stream comprising the consecutive events in that other said data stream, and
wherein an amount of adjustment required to align event sequences in the data streams indicates respective delays of the data streams.

13. A non-transitory computer-readable medium embodying a program which, when executed on a computer processor of a synchronization device, is configured to cause the computer processor to carry out a method comprising:
receiving a data stream at a synchronization buffer of the synchronization device;
detecting events in a received data stream;
broadcasting event information including event detection times;
receiving, from each synchronization device in the system, event information including the event detection times of detected events at each synchronization device;
determining a first delay time of a most delayed data stream in the system;
calculating a second delay time, applied by changing a capacity of the synchronization buffer such that a delay time applied is a result of the capacity, to be applied to the received data stream to synchronize the received data stream with the most delayed data stream; and
instructing the synchronisation buffer to delay the data stream by the second delay time to synchronize the received data stream with the most delayed data stream, wherein an event detector for detecting the event is positioned after the synchronization buffer so that the data stream passes through the event detector after passing through the synchronization buffer, wherein the determining the first delay time of the most delayed data stream comprises, without information to distinguish between the events in the received data stream other than the event detection times, and without information to distinguish between the events in each other said data stream other than the event detection times, determining which data stream is the most delayed data stream by aligning differences between the detection times of consecutive events in the received data stream with differences between the detection times of consecutive events in each other said data stream to align an event sequence comprising the consecutive events in the received data stream with an event sequence in each other said data stream comprising the consecutive events in that other said data stream, and wherein the amount of adjustment required to align event sequences in the data streams indicates the respective delays of the data streams.

* * * * *